US011500136B2

(12) United States Patent
Akiyama

(10) Patent No.: US 11,500,136 B2
(45) Date of Patent: Nov. 15, 2022

(54) LIGHT SOURCE DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 121 days.

(21) Appl. No.: 17/102,539

(22) Filed: Nov. 24, 2020

(65) Prior Publication Data

US 2021/0157039 A1     May 27, 2021

(30) Foreign Application Priority Data

Nov. 25, 2019    (JP) .............................. JP2019-212094

(51) Int. Cl.
*G03B 21/20* (2006.01)
*G02B 5/04* (2006.01)

(52) U.S. Cl.
CPC ........... *G02B 5/045* (2013.01); *G03B 21/204* (2013.01)

(58) Field of Classification Search
None
See application file for complete search history.

(56) References Cited

U.S. PATENT DOCUMENTS

| 2011/0149549 A1 | 6/2011 | Miyake |
| 2011/0234998 A1 | 9/2011 | Kurosaki |
| 2016/0370696 A1 | 12/2016 | Akiyama |
| 2016/0373704 A1 | 12/2016 | Akiyama |
| 2018/0210328 A1* | 7/2018 | Uehara ................ G03B 21/208 |

FOREIGN PATENT DOCUMENTS

| CN | 106257329 A | 12/2016 |
| JP | 2011-129354 A | 6/2011 |
| JP | 2011-197597 A | 10/2011 |
| JP | 2015169675 A * | 9/2015 |
| JP | 2017-009683 A | 1/2017 |
| JP | 2019-020476 A | 2/2019 |

* cited by examiner

*Primary Examiner* — Bao-Luan Q Le
*Assistant Examiner* — Danell L Owens
(74) *Attorney, Agent, or Firm* — Oliff PLC

(57) ABSTRACT

A light source device according to the present disclosure includes a light source section for emitting a first pencil and a second pencil which have a first wavelength band, a first optical element for altering a proceeding direction of a principal ray of the first pencil, a second optical element for altering a proceeding direction of a principal ray of the second pencil, and a wavelength conversion layer having a plane of incidence which the first pencil and the second pencil enter, and for performing wavelength conversion of the first pencil and the second pencil into fluorescence having a second wavelength band. The first optical element and the second optical element alter the proceeding directions of the principal ray of the first pencil and the principal ray of the second pencil so that the first pencil and the second pencil fail to overlap each other on the plane of incidence.

5 Claims, 6 Drawing Sheets

LIGHT SOURCE DEVICE AND PROJECTOR

The present application is based on, and claims priority from JP Application Serial Number 2019-212094, filed Nov. 25, 2019, the disclosure of which is hereby incorporated by reference herein in its entirety.

BACKGROUND

1. Technical Field

The present disclosure relates to a light source device and a projector.

2. Related Art

In the projector field, there is proposed a light source device using fluorescence emitted from a phosphor when irradiating the phosphor with excitation light emitted from a light source. In JP-A-2011-129354 (Document 1), there is disclosed a light source device which is provided with a solid-state light source, a phosphor layer, and a radiator substrate, and in which the solid-state light source and the phosphor layer are disposed so as to spatially be separated from each other, and fluorescence is taken out using a reflecting surface of the phosphor layer.

In the light source device of Document 1, when the phosphor layer is irradiated with excitation light from the solid-state light source, the fluorescence generated inside the phosphor layer is emitted from a side surface of the phosphor layer in some cases. In this case, there is a possibility that a loss of the fluorescence from the side surface of the phosphor layer occurs to decrease the use efficiency of the fluorescence.

SUMMARY

In order to solve the problem described above, a light source device according to an aspect of the present disclosure includes a light source section configured to emit a first pencil and a second pencil which have a first wavelength band, a first optical element configured to alter a proceeding direction of a principal ray of the first pencil, a second optical element configured to alter a proceeding direction of a principal ray of the second pencil, and a wavelength conversion layer having a plane of incidence which the first pencil and the second pencil enter, and configured to perform wavelength conversion of the first pencil and the second pencil into fluorescence having a second wavelength band different from the first wavelength band, wherein the first optical element and the second optical element alter the proceeding directions of the principal ray of the first pencil and the principal ray of the second pencil so that the first pencil and the second pencil fail to overlap each other on the plane of incidence.

In the light source device according to the aspect of the present disclosure, a deviation direction by the first optical element and a deviation direction by the second optical element may be perpendicular to each other.

In the light source device according to the aspect of the present disclosure, the first optical element and the second optical element may be deviation prisms.

In the light source device according to the aspect of the present disclosure, the first optical element and the second optical element may be integrated with each other.

In the light source device according to the aspect of the present disclosure, the deviation prism may have a plane of incidence and an exit surface different from the plane of incidence, and a deviation direction generated on the plane of incidence and a deviation direction generated on the exit surface may be perpendicular to each other.

A projector according to another aspect of the present disclosure includes the light source device according to the aspect of the present disclosure, a light modulation device configured to modulate light emitted from the light source device in accordance with image information, and a projection optical device configured to project the light modulated by the light modulation device.

DESCRIPTION OF EXEMPLARY EMBODIMENTS

First Embodiment

Figure 1:
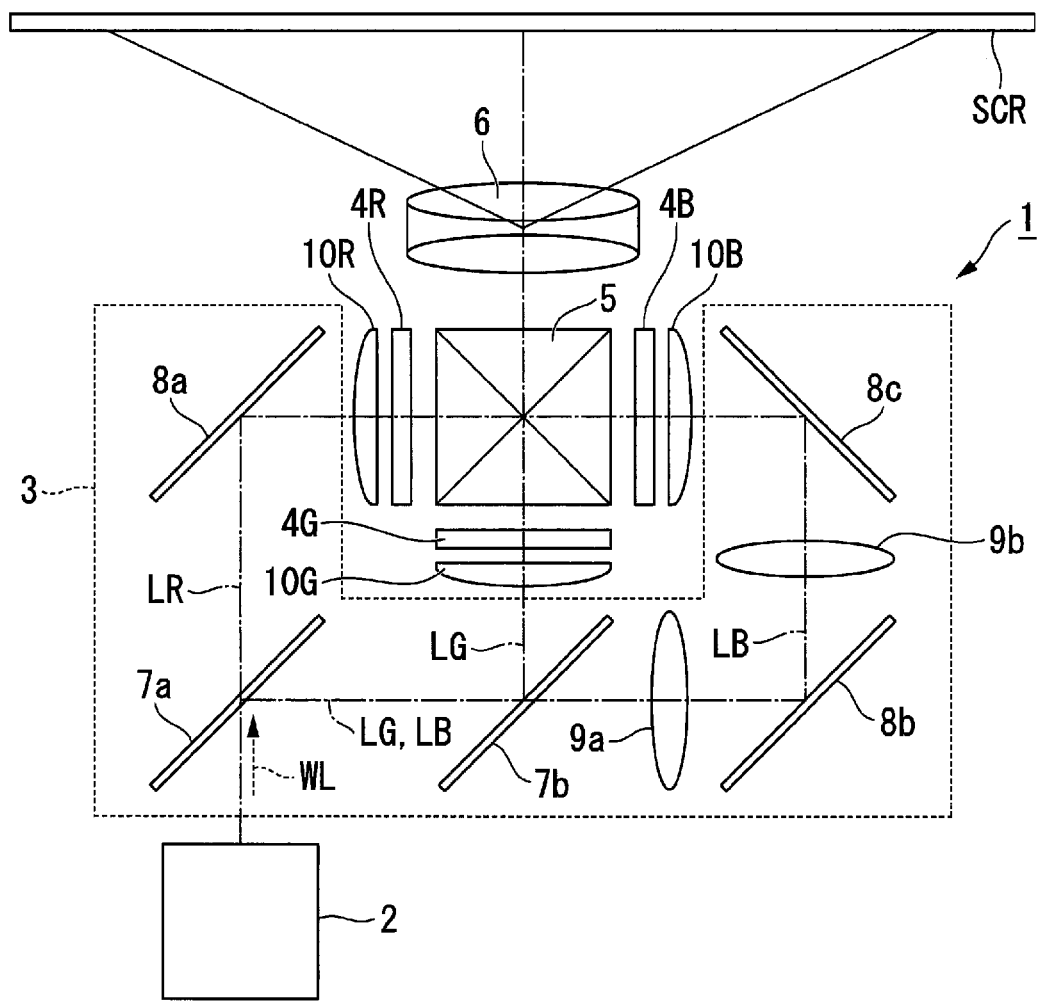
FIG. 1 is a schematic configuration diagram of a projector according to a first embodiment.

A first embodiment of the present disclosure will hereinafter be described using FIG. 1 through FIG. 7.

In the drawings described below, the constituents are shown with the respective scale ratios of the sizes different from each other in some cases in order to make the constituents eye-friendly.

An example of a projector according to the present embodiment will be described.

FIG. 1 is a diagram showing a schematic configuration of the projector according to the present embodiment.

As shown in FIG. 1, the projector 1 according to the present embodiment is a projection-type image display device for displaying a color image on a screen SCR. The projector 1 is provided with an illumination device 2, a color separation optical system 3, a light modulation device 4R, a light modulation device 4G, a light modulation device 4B, a combining optical system 5, and a projection optical device 6. The configuration of the illumination device 2 will be described later.

The color separation optical system 3 is provided with a first dichroic mirror 7a, a second dichroic mirror 7b, a reflecting mirror 8a, a reflecting mirror 8b, a reflecting mirror 8c, a relay lens 9a, and a relay lens 9b. The color separation optical system 3 separates illumination light WL emitted from the illumination device 2 into red light LR, green light LG, and blue light LB, and then guides the red light LR to the light modulation device 4R, guides the green light LG to the light modulation device 4G, and guides the blue light LB to the light modulation device 4B.

A field lens 10R is disposed between the color separation optical system 3 and the light modulation device 4R, and substantially collimates the incident light and then emits the result toward the light modulation device 4R. A field lens 10G is disposed between the color separation optical system 3 and the light modulation device 4G, and substantially collimates the incident light and then emits the result toward the light modulation device 4G. A field lens 10B is disposed between the color separation optical system 3 and the light modulation device 4B, and substantially collimates the incident light and then emits the result toward the light modulation device 4B.

The first dichroic mirror 7a transmits a red light component and reflects a green light component and a blue light component. The second dichroic mirror 7b reflects the green light component, and transmits the blue light component. The reflecting mirror 8a reflects the red light component. The reflecting mirror 8b and the reflecting mirror 8c reflect the blue light component.

The red light LR having been transmitted through the first dichroic mirror 7a is reflected by the reflecting mirror 8a, and is then transmitted through the field lens 10R to enter an image forming area of the light modulation device 4R for the red light. The green light LG having been reflected by the first dichroic mirror 7a is further reflected by the second dichroic mirror 7b, and then transmitted through the field lens 10G to enter an image forming area of the light modulation device 4G for the green light. The blue light LB having been transmitted through the second dichroic mirror 7b enters an image forming area of the light modulation device 4B for the blue light via the relay lens 9a, the reflecting mirror 8b on the incident side, the relay lens 9b, the reflecting mirror 8c on the exit side, and the field lens 10B.

The light modulation device 4R, the light modulation device 4G, and the light modulation device 4B each modulate the colored light as the incident light in accordance with image information to thereby form image light. The light modulation device 4R, the light modulation device 4G, and the light modulation device 4B are each formed of a liquid crystal light valve. Although not shown in the drawings, on the light incident side of each of the light modulation device 4R, the light modulation device 4G, and the light modulation device 4B, there is disposed an incident side polarization plate. On the light exit side of each of the light modulation device 4R, the light modulation device 4G, and the light modulation device 4B, there is disposed an exit side polarization plate.

The combining optical system 5 combines the image light emitted from the light modulation device 4R, the image light emitted from the light modulation device 4G, and the image light emitted from the light modulation device 4B with each other to form full-color image light. The combining optical system 5 is formed of a cross dichroic prism having four rectangular prisms bonded to each other to have a substantially square shape in the plan view. On the interfaces having a substantially X shape on which the rectangular prisms are bonded to each other, there are formed dielectric multilayer films.

The image light emitted from the combining optical system 5 is projected by the projection optical device 6 in an enlarged manner to form an image on the screen SCR. In other words, the projection optical device 6 projects the light modulated by the light modulation device 4R, the light modulated by the light modulation device 4G, and the light modulated by the light modulation device 4B. The projection optical device 6 is constituted by a plurality of projection lenses.

An example of the illumination device 2 in the present embodiment will be described.

Figure 2:
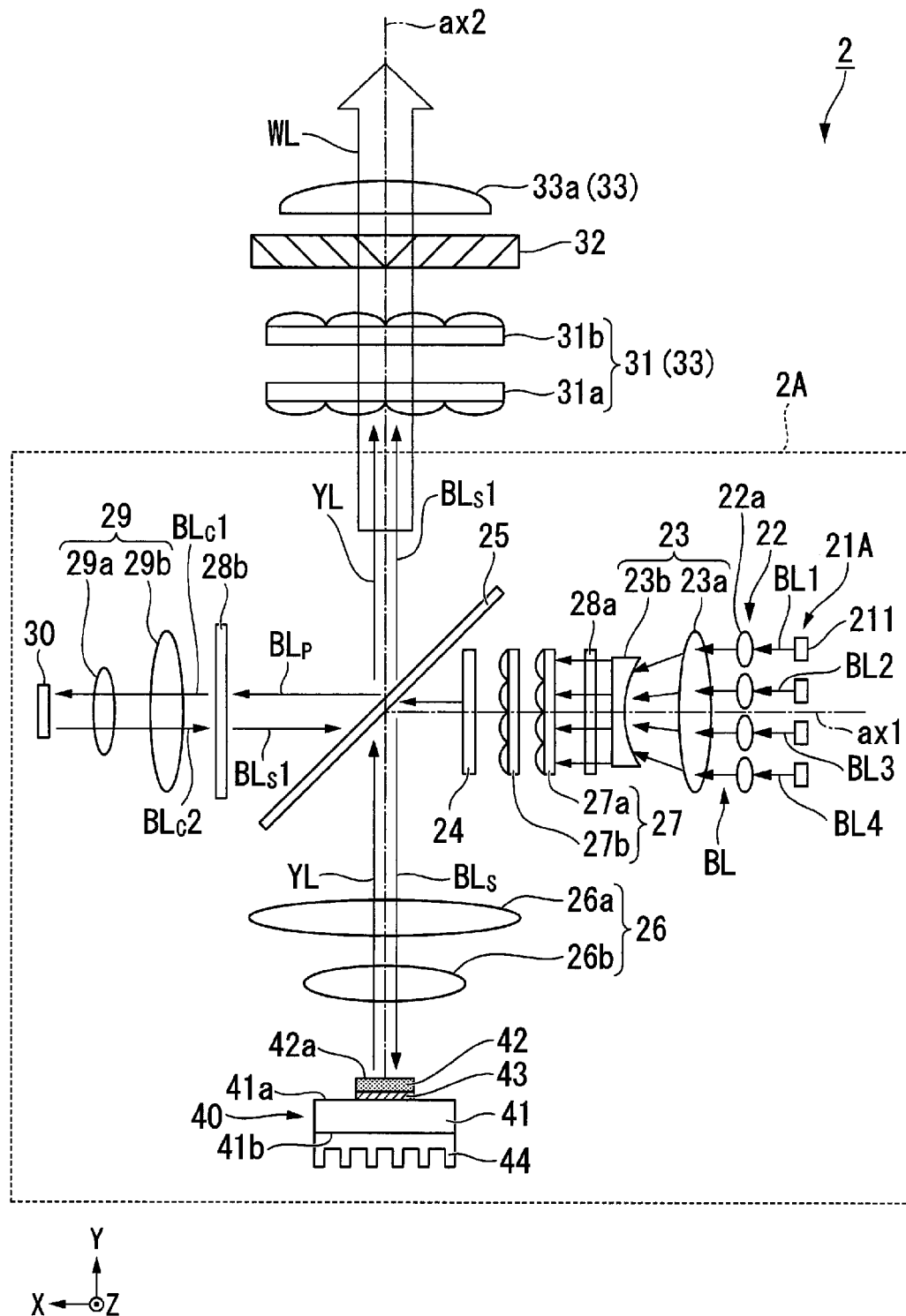
FIG. 2 is a schematic configuration diagram of a light source device according to the first embodiment.

FIG. 2 is a diagram showing a schematic configuration of the illumination device 2.

As shown in FIG. 2, the illumination device 2 is provided with a light source device 2A, an integrator optical system 31, a polarization conversion element 32, and a superimposing lens 33a. The integrator optical system 31 and the superimposing lens 33a constitute a superimposing optical system 33.

The light source device 2A is provided with a light source section 21A, a collimator optical system 22, an a focal optical system 23, a first wave plate 28a, a homogenizer optical system 27, a light path alteration section 24, a polarization split element 25, a first light collection optical system 26, a wavelength conversion element 40, a second wave plate 28b, a second light collection optical system 29, and a diffusely reflecting element 30.

Hereinafter, a direction in which a light beam BL is emitted from the light source section 21A is defined as an X-axis direction, a direction in which fluorescence YL is emitted from the wavelength conversion element 40 is defined as a Y-axis direction, and a direction perpendicular to the X-axis direction and the Y-axis direction is defined as a Z-axis direction.

The light source section 21A, the collimator optical system 22, the a focal optical system 23, the first wave plate 28a, the homogenizer optical system 27, the light path alteration section 24, the polarization split element 25, the second wave plate 28b, the second light collection optical system 29, and the diffusely reflecting element 30 are arranged in series on a light axis ax1. The wavelength conversion element 40, the first light collection optical system 26, the polarization split element 25, the integrator optical system 31, the polarization conversion element 32, and the superimposing lens 33a are arranged in series on a light axis ax2. The light axis ax1 and the light axis ax2 are located in the same plane, and are perpendicular to each other.

The light source section 21A is provided with a plurality of light emitting elements 211 for emitting the excitation light beams. The plurality of light emitting elements 211 is arranged in an array in a plane perpendicular to the light axis ax1. In the case of the present embodiment, the light source section 21A has a configuration in which four sets of light source units each having the four light emitting elements 211 arranged in a line are arranged in a direction perpendicular to the arrangement direction of the four light emitting elements 211. In other words, the light source section 21A has a configuration having the sixteen light emitting elements 211 in a 4×4 array. It should be noted that the number and the arrangement of the light emitting elements 211 are not limited to the configuration described above.

Figure 3:
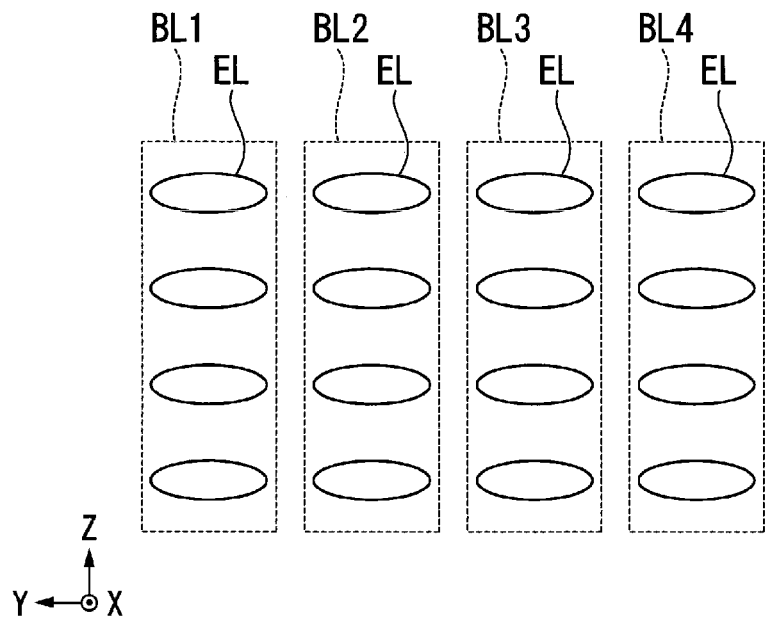
FIG. 3 is a front view showing an arrangement of excitation light beams emitted from a light source section.

FIG. 3 is a front view of the arrangement of the excitation light beams EL emitted from the light source section 21A viewed from the emission direction of the excitation light beams EL.

As shown in FIG. 3, the sixteen excitation light beams EL emitted from the sixteen light emitting elements 211 are arranged in a 4×4 array. Here, the four excitation light beams EL arranged in the vertical direction shown in FIG. 3 are collectively referred to as a pencil. Hereinafter, for the sake of convenience of explanation, in FIG. 3, the pencil at the left end is referred to as a first pencil BL1, the second pencil from the left is referred to as a second pencil BL2, the second pencil from the right is referred to as a third pencil BL3, and the pencil at the right end is referred to as a fourth pencil BL4.

As shown in FIG. 2, the light emitting element 211 is formed of a semiconductor laser element. The semiconductor laser element emits a blue light beam in a first wavelength band, specifically, a laser beam in a first wavelength band with a peak wavelength of, for example, 460 nm. Therefore, the light source section 21A emits the pencils BL including the first pencil BL1, the second pencil BL2, the third pencil BL3, and the fourth pencil BL4 as a whole.

The pencils BL emitted from the light source section 21A enter the collimator optical system 22. The collimator optical system 22 converts the pencils BL emitted from the light source section 21A into parallel light. The collimator optical system 22 is constituted by a plurality of collimator lenses 22a arranged side by side in an array. The collimator lenses 22a are disposed so as to correspond one-to-one to the light emitting elements 211.

The pencils BL having been transmitted through the collimator optical system 22 enter the a focal optical system 23. The a focal optical system 23 adjusts the diameter of the pencils BL, namely the thickness of the pencils BL. The a focal optical system 23 is constituted by a convex lens 23a and a concave lens 23b. In the case of the present embodiment, the a focal optical system 23 adjusts the thickness of each of the first pencil BL1, the second pencil BL2, the third pencil BL3, and the fourth pencil BL4 so as to be substantially ¼ as large as the area of the plane of incidence when irradiating the plane of incidence of the wavelength conversion layer with each of the pencils.

The pencils BL having passed through a focal optical system 23 enter the first wave plate 28a. The first wave plate 28a is formed of, for example, a ½ wave plate which is made rotatable. The pencils BL emitted from the light emitting elements 211 are each linearly polarized light having a predetermined polarization direction. By appropriately setting the rotational angle of the first wave plate 28a, the pencils BL including an S-polarization component and a P-polarization component with respect to the polarization split element 25 at a predetermined ratio can be obtained as the pencils BL transmitted through the first wave plate 28a. By changing the rotational angle of the first wave plate 28a, it is possible to change the ratio between the S-polarization component and the P-polarization component.

The pencils BL having passed through the first wave plate 28a enter the homogenizer optical system 27. The homogenizer optical system 27 converts the light intensity distribution of the pencils BL into a homogenous distribution, namely a so-called top-hat distribution, on the plane of incidence 42a of the wavelength conversion layer 42 as the illumination target area. The homogenizer optical system 27 is constituted by a multi-lens array 27a and a multi-lens array 27b.

The pencils BL having been emitted from the homogenizer optical system 27 enter the light path alteration section 24. The light path alteration section 24 changes the proceeding direction of the principal ray of each of the first pencil BL1, the second pencil BL2, the third pencil BL3, and the fourth pencil BL4. The configuration of the light path alteration section 24 will be described later in detail.

The pencils BL emitted from the light path alteration section 24 and including the S-polarization component and the P-polarization component enter the polarization split element 25. The polarization split element 25 is formed of, for example, a polarization beam splitter having wavelength selectivity. The polarization separation element 25 is arranged so as to form an angle of 45° with respect to each of the light axis ax1 and the light axis ax2.

The polarization split element 25 has a polarization split function of splitting each of the pencils BL into a pencil BLs as the S-polarization component with respect to the polarization split element 25 and a pencil BLp as the P-polarization component. Specifically, the polarization split element 25 reflects the pencil BLs as the S-polarization component, and transmits the pencil BLp as the P-polarization component. Further, the polarization split element 25 has a color separation function of transmitting a yellow light component different in wavelength band from the pencil BL as blue light irrespective of the polarization state of the yellow light component in addition to the polarization split function.

The pencil BLs as the S-polarized light having been emitted from the polarization split element 25 enters the first light collection optical system 26. The first light collection optical system 26 converges the pencil BLs toward the wavelength conversion element 40. The first light collection optical system 26 is constituted by a first lens 26a and a second lens 26b. The first lens 26a and the second lens 26b are each formed of a convex lens. The pencil BLs having been emitted from the first light collection optical system 26 enters the wavelength conversion layer 42 of the wavelength conversion element 40 in a converged state.

The wavelength conversion element 40 is provided with a base member 41, a wavelength conversion layer 42, a reflecting layer 43, and a heatsink 44. In the present embodiment, the wavelength conversion layer 42 is formed of a phosphor. The planar shape of the wavelength conversion layer 42 viewed from the incident side of the pencil BLs is a substantially square shape. In the present embodiment, as the wavelength conversion element 40, there is used a stationary wavelength conversion element which does not have a drive source such as a motor, and is not made rotatable.

The wavelength conversion layer 42 includes a ceramic phosphor, and converts the pencil BLs into the fluorescence YL in a second wavelength band different from the first wavelength band. The wavelength conversion layer 42 has the plane of incidence 42a which the first pencil BL1, the second pencil BL2, the third pencil BL3, and the fourth pencil BL4 enter. Further, inside the wavelength conversion layer 42, there is dispersed a plurality of scattering bodies (not shown) formed of air holes or the like. Thus, the fluorescence YL generated inside the wavelength conversion layer 42 changes the proceeding direction due to the scattering bodies, and is then emitted from the plane of incidence 42a. The second wavelength band is in a range of, for example, 490 through 750 nm, and the fluorescence YL is yellow light including the green light component and the red light component. It should be noted that it is also possible for the wavelength conversion layer 42 to include a single-crystal phosphor.

The wavelength conversion layer 42 includes, for example, an yttrium aluminum garnet (YAG) type phosphor. Citing YAG:Ce including cerium (Ce) as an activator agent as an example, as the wavelength conversion layer 42, there can be used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process, or a thermal plasma process.

The wavelength conversion layer 42 is bonded to a first surface 41a of the base member 41 with a bonding material (not shown). As the bonding material, there is used, for example, a nano-silver sintered metal material. The base member 41 is formed of a metal material high in thermal conductivity such as copper.

The reflecting layer 43 is disposed between the first surface 41a of the base member 41 and the wavelength conversion layer 42. The reflecting layer 43 is formed of a metal material high in optical reflectance such as silver or aluminum, or a dielectric multilayer film. The fluorescence proceeding inside the wavelength conversion layer 42 is reflected by the reflecting layer 43 toward the plane of incidence 42a.

The heatsink 44 is disposed on a second surface 41b of the base member 41. The heatsink 44 has a plurality of fins, and is formed of a metal material high in thermal conductivity such as copper. The heatsink 44 is fixed to the base member 41 with, for example, metal bonding. Since the heat of the wavelength conversion layer 42 is released outside via the heatsink 44, it is possible to suppress the thermal deterioration of the wavelength conversion layer 42.

The fluorescence YL as yellow light having been generated in the wavelength conversion element 40 is collimated by the first light collection optical system 26, and then enters the polarization split element 25. As described above, since the polarization split element 25 has a property of transmitting the yellow light component irrespective of the polarization state, the fluorescence YL is transmitted through the polarization split element 25.

Meanwhile, the pencil BLp as the P-polarized light having been emitted from the polarization split element 25 enters the second wave plate 28b. The second wave plate 28b is formed of a ¼ wave plate disposed in the light path between the polarization split element 25 and the diffusely reflecting element 30. Therefore, the pencil BLp as the P-polarized light having been emitted from the polarization split element 25 is converted by the second wave plate 28b into, for example, a blue pencil BLc1 as clockwise circularly polarized light, and then enters the second light collection optical system 29.

The second light collection optical system 29 is constituted by a first lens 29a and a second lens 29b. The first lens 29a and the second lens 29b are each formed of a convex lens. The second light collection optical system 29 makes the blue pencil BLc1 enter the diffusely reflecting element 30 in a converged state.

The diffusely reflecting element 30 is disposed on the light path of the pencil BLp emitted from the polarization split element 25. The diffusely reflecting element 30 diffusely reflects the blue pencil BLc1, which has been emitted from the second light collection optical system 29, toward the polarization split element 25. It is desirable for the diffusely reflecting element 30 to perform the Lambertian reflection on the blue pencil BLc1, and at the same time, not to disturb the polarization state of the blue pencil BLc1.

The light diffusely reflected by the diffusely reflecting element 30 is hereinafter referred to as a blue pencil BLc2. In the present embodiment, by diffusely reflecting the blue pencil BLc1, there can be obtained the blue pencil BLc2 having a substantially homogenous intensity distribution. For example, the blue pencil BLc1 as the clockwise circularly polarized light is diffusely reflected by the diffusely reflecting element 30 to thereby be converted into the blue pencil BLc2 as the counterclockwise circularly polarized light.

The blue pencil BLc2 is converted by the second light collection optical system 29 into a parallel pencil, and then enters the second wave plate 28b once again. The blue pencil BLc2 as the counterclockwise circularly polarized light is converted by the second wave plate 28b into a blue pencil BLs1 as S-polarized light. The blue pencil BLs1 as the S-polarized light is reflected by the polarization split element 25 toward the integrator optical system 31.

Thus, the blue pencil BLs1 is combined with the fluorescence YL having been transmitted through the polarization split element 25, and is used as the illumination light WL. Specifically, the blue pencil BLs1 and the fluorescence YL are emitted from the polarization split element 25 toward the respective directions the same as each other, and thus, there is generated the illumination light WL as the white light having the blue pencil BLs1 and the fluorescence YL as the yellow light combined with each other.

The illumination light WL is emitted toward the integrator optical system 31. The integrator optical system 31 is constituted by a first lens array 31a and a second lens array 31b. The first lens array 31a and the second lens array 31b each have a configuration having a plurality of lenses arranged in an array.

The illumination light WL having been transmitted through the integrator optical system 31 enters the polarization conversion element 32. The polarization conversion element 32 has a polarization split film and a wave plate. The polarization conversion element 32 converts the illumination light WL including the fluorescence YL as unpolarized light into linearly polarized light which are made to enter the light modulation device 4R, the light modulation device 4G, and the light modulation device 4B.

The illumination light WL having been transmitted through the polarization conversion element 32 enters the superimposing lens 33a. The superimposing lens 33a homogenizes the illuminance distribution of the illumination light WL in the illumination target area in cooperation with the integrator optical system 31. The illumination device 2 generates the illumination light WL in such a manner as described above.

Hereinafter, the light path alteration section 24 will be described.

Figure 4:
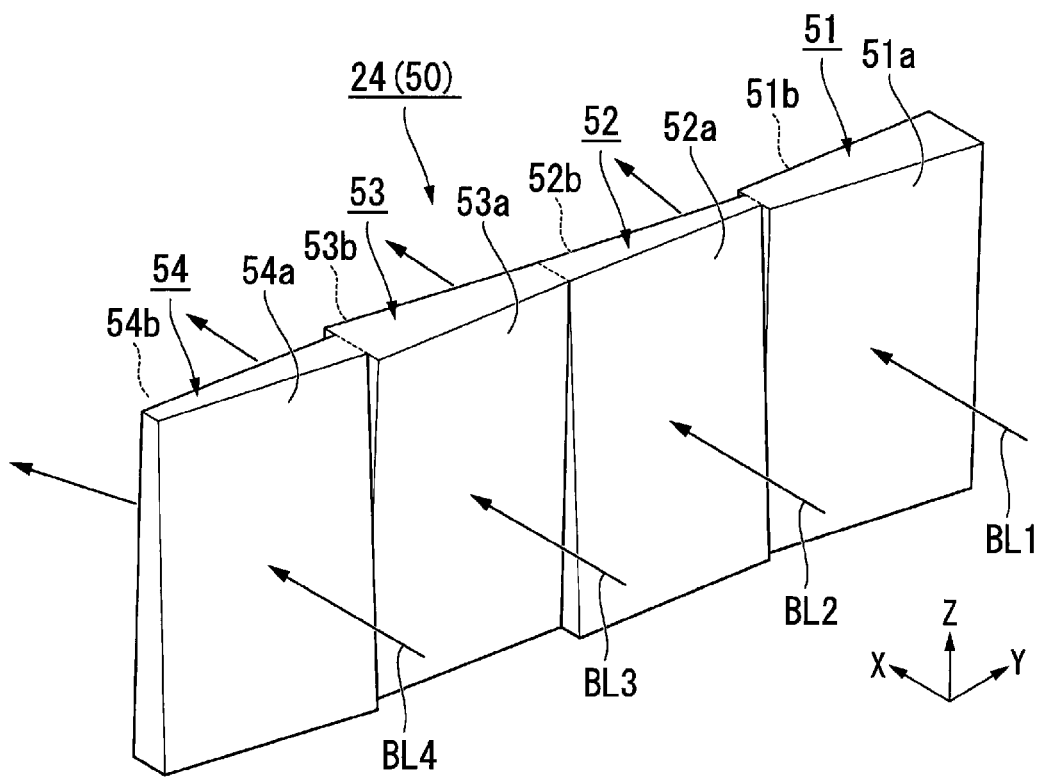
FIG. 4 is a perspective view of a light path alteration section.

FIG. 4 is a perspective view of the light path alteration section 24.

As shown in FIG. 4, the light path alteration section 24 is formed of a deviation prism array 50. The deviation prism array 50 has four deviation prisms including a first deviation prism 51 (a first optical element), a second deviation prism 52 (a second optical element), a third deviation prism 53, and a fourth deviation prism 54. The deviation prism array 50 is formed of a single member having the four deviation prisms 51, 52, 53, and 54 described above integrated with each other. It should be noted that in the deviation prism array 50, it is possible for the four deviation prisms 51, 52, 53, and 54 to be formed of individual members.

The first deviation prism 51 is disposed on the light path of the first pencil BL1 emitted from the homogenizer optical system 27 to alter the proceeding direction of the principal ray of the first pencil BL1. The second deviation prism 52 is disposed on the light path of the second pencil BL2 emitted from the homogenizer optical system 27 to alter the proceeding direction of the principal ray of the second pencil BL2. The third deviation prism 53 is disposed on the light path of the third pencil BL3 emitted from the homogenizer optical system 27 to alter the proceeding direction of the principal ray of the third pencil BL3. The fourth deviation prism 54 is disposed on the light path of the fourth pencil BL4 emitted from the homogenizer optical system 27 to alter the proceeding direction of the principal ray of the fourth pencil BL4.

The first deviation prism 51 has a plane of incidence 51a and an exit surface 51b different from the plane of incidence 51a. The second deviation prism 52 has a plane of incidence 52a and an exit surface 52b different from the plane of incidence 52a. The third deviation prism 53 has a plane of incidence 53a and an exit surface 53b different from the plane of incidence 53a. The fourth deviation prism 54 has a plane of incidence 54a and an exit surface 54b different from the plane of incidence 54a.

The cross-sectional shape in the X-Y plane of each of the first deviation prism 51, the second deviation prism 52, the third deviation prism 53, and the fourth deviation prism 54 is a trapezoidal shape, and the cross-sectional shape in the X-Z plane of each of these deviation prisms is a trapezoidal shape. Therefore, the proceeding directions of the principal rays of the pencils BL1, BL2, BL3, and BL4 having entered the deviation prisms 51, 52, 53, and 54 are refracted along the Y-axis direction and the Z-axis direction.

Figure 5:
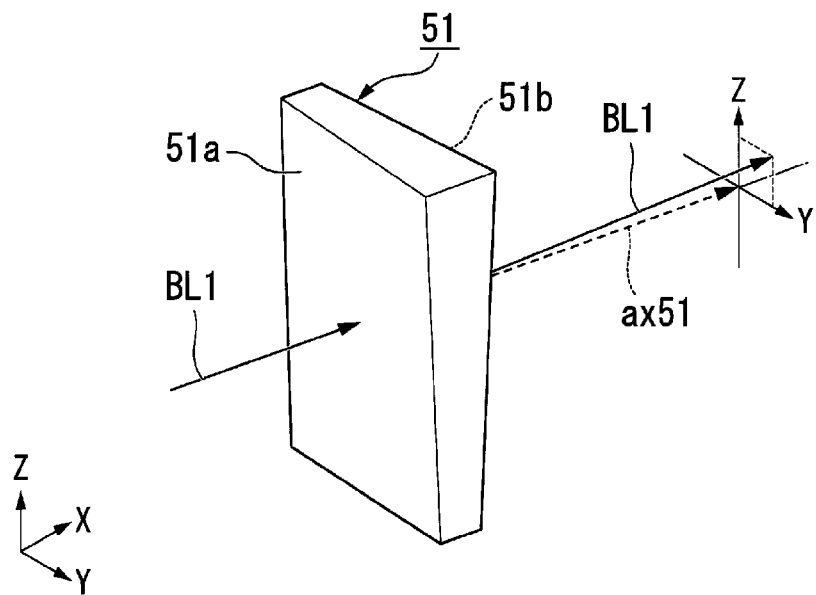
FIG. 5 is a perspective view of a first deviation prism.

FIG. 5 is a perspective view of the first deviation prism 51.

As shown in FIG. 5, in the first deviation prism 51, the short side is disposed on the −Y-axis direction side and the long side is disposed on the +Y-axis direction side in the trapezoid as the cross-sectional shape in the X-Y plane, and the short side is disposed on the −Z-axis direction side and the long side is disposed on the +Z-axis direction side in the trapezoid as the cross-sectional shape in the X-Z plane. Therefore, the principal ray of the first pencil BL1 passes through the first deviation prism 51 to thereby proceed toward a direction shifted toward the +Y-axis direction and the +Z-axis direction with respect to the optical axis ax51 of the first deviation prism 51. It should be noted that the optical axis ax51 of the first deviation prism 51 is an axis which passes through the centers of the plane of incidence 51a and the exit surface 51b, and is parallel to the light axis ax1 shown in FIG. 2.

Hereinafter, the illustration of the individual deviation prisms will be omitted.

As shown in FIG. 4, in the second deviation prism 52, the short side is disposed on the +Y-axis direction side and the long side is disposed on the −Y-axis direction side in the trapezoid as the cross-sectional shape in the X-Y plane, and the short side is disposed on the +Z-axis direction side and the long side is disposed on the −Z-axis direction side in the trapezoid as the cross-sectional shape in the X-Z plane. Therefore, the principal ray of the second pencil BL2 passes through the second deviation prism 52 to thereby proceed toward a direction shifted toward the −Y-axis direction and the −Z-axis direction with respect to the optical axis of the second deviation prism 52.

In the third deviation prism 53, the short side is disposed on the +Y-axis direction side and the long side is disposed on the −Y-axis direction side in the trapezoid as the cross-sectional shape in the X-Y plane, and the short side is disposed on the −Z-axis direction side and the long side is disposed on the +Z-axis direction side in the trapezoid as the cross-sectional shape in the X-Z plane. Therefore, the principal ray of the third pencil BL3 passes through the third deviation prism 53 to thereby proceed toward a direction shifted toward the −Y-axis direction and the +Z-axis direction with respect to the optical axis of the third deviation prism 53. In the fourth deviation prism 54, the short side is disposed on the −Y-axis direction side and the long side is disposed on the +Y-axis direction side in the trapezoid as the cross-sectional shape in the X-Y plane, and the short side is disposed on the +Z-axis direction side and the long side is disposed on the −Z-axis direction side in the trapezoid as the cross-sectional shape in the X-Z plane. Therefore, the principal ray of the fourth pencil BL4 passes through the fourth deviation prism 54 to thereby proceed toward a direction shifted toward the +Y-axis direction and the −Z-axis direction with respect to the optical axis of the fourth deviation prism 54.

By disposing the light path alteration section 24 having the configuration described above, the first pencil BL1, the second pencil BL2, the third pencil BL3, and the fourth pencil BL4 enter the first light collection optical system 26 from four directions which are nonparallel to the light axis ax2, and are different from each other when being reflected by the polarization split element 25 and then entering the first light collection optical system 26.

It is assumed that all of the first pencil BL1, the second pencil BL2, the third pencil BL3, and the fourth pencil BL4 enter the first light collection optical system 26 from a direction parallel to the light axis ax2. In this case, the first light collection optical system 26 collects the first pencil BL1, the second pencil BL2, the third pencil BL3, and the fourth pencil BL4 so that all of the principal rays of the first pencil BL1, the second pencil BL2, the third pencil BL3, and the fourth pencil BL4 overlap each other at the center of the plane of incidence 42a of the wavelength conversion layer 42.

However, in the case of the present embodiment, as described above, the first pencil BL1, the second pencil BL2, the third pencil BL3, and the fourth pencil BL4 respectively enter the first light collection optical system 26 from the four directions which are nonparallel to the light axis ax2, and are different from each other. Thus, the first light collection optical system 26 guides the first pencil BL1, the second pencil BL2, the third pencil BL3, and the fourth pencil BL4 to positions where all of the first pencil BL1, the second pencil BL2, the third pencil BL3, and the fourth pencil BL4 fail to overlap each other on the plane of incidence 42a of the wavelength conversion layer 42.

Figure 6:
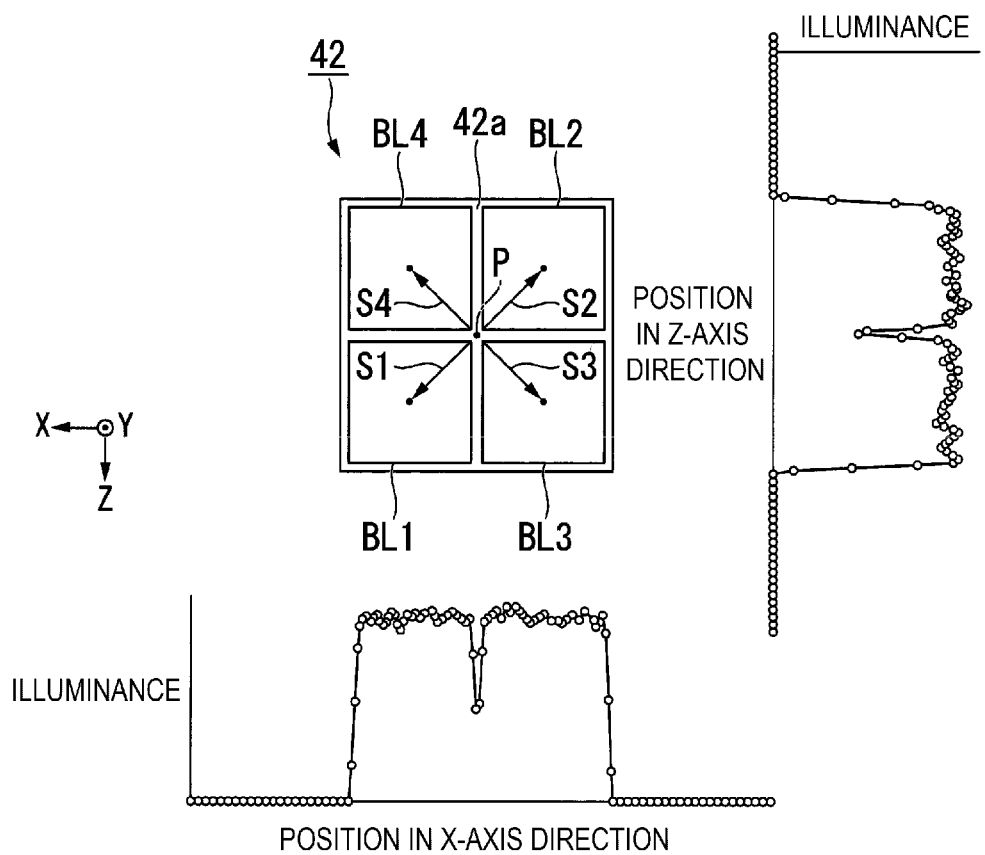
FIG. 6 is a diagram showing an illuminance distribution on a plane of incidence of a wavelength conversion layer.

FIG. 6 is a diagram showing the illuminance distribution of the pencils BL1, BL2, BL3, and BL4 on the plane of incidence 42a of the wavelength conversion layer 42.

As shown in FIG. 6, the plane of incidence 42a of the wavelength conversion layer 42 is irradiated with the first pencil BL1, the second pencil BL2, the third pencil BL3, and the fourth pencil BL4 so that the first pencil BL1, the second pencil BL2, the third pencil BL3, and the fourth pencil BL4 do not overlap each other, but are arranged in a 2×2 matrix along the X-axis direction and the Z-axis direction. Further, the irradiation with the first pencil BL1, the second pencil BL2, the third pencil BL3, and the fourth pencil BL4 is performed at intervals.

The principal ray of the first pencil BL1 is located at a point shifted toward the +X-axis direction and shifted toward the +Z-axis direction with respect to the center P of the plane of incidence 42a. The principal ray of the second pencil BL2 is located at a point shifted toward the −X-axis direction and shifted toward the −Z-axis direction with respect to the center P of the plane of incidence 42a. The principal ray of the third pencil BL3 is located at a point shifted toward the −X-axis direction and shifted toward the +Z-axis direction with respect to the center P of the plane of incidence 42a. The principal ray of the fourth pencil BL4 is located at a point shifted toward the +X-axis direction and shifted toward the −Z-axis direction with respect to the center P of the plane of incidence 42a. As described above, the deviation prisms 51, 52, 53, and 54 constituting the light path alteration section 24 alter the proceeding directions of the principal rays of the respective pencils BL1, BL2, BL3, and BL4 so that all of the first pencil BL1, the second pencil BL2, the third pencil BL3, and the fourth pencil BL4 fail to overlap each other on the plane of incidence 42a of the wavelength conversion layer 42.

The directions in which the principal rays of the respective pencils BL1, BL2, BL3, and BL4 are moved by the respective deviation prisms 51, 52, 53, and 54 from the center P of the plane of incidence 42a on the plane of incidence 42a of the wavelength conversion layer 42 as indicated by the four arrows in FIG. 6 are each defined as a deviation direction. In the case of the present embodiment, the deviation direction S1 by the first deviation prism 51 and the deviation direction S2 by the second deviation prism 52 are perpendicular to each other. Similarly, the deviation direction S2 by the second deviation prism 52 and the deviation direction S3 by the third deviation prism 53 are perpendicular to each other. The deviation direction S3 by the third deviation prism 53 and the deviation direction S4 by the fourth deviation prism 54 are perpendicular to each other. The deviation direction S4 by the fourth deviation prism 54 and the deviation direction S1 by the first deviation prism 51 are perpendicular to each other.

The inventors have performed a simulation of the illuminance distribution of the pencils BL1, BL2, BL3, and BL4 on the plane of incidence 42a of the wavelength conversion layer 42. In FIG. 6, there are shown a relationship between the position in the X-axis direction and the illuminance, and a relationship between the position in the Z-axis direction and the illuminance as a result of the simulation.

It has been confirmed that there can be obtained the distribution in which the highest illuminance is substantially constant irrespective of the positions in the X-axis direction and the Z-axis direction, namely a so-called top-hat distribution, in each of the pencils BL1, BL2, BL3, and BL4 on the plane of incidence 42a of the wavelength conversion layer 42 as shown in FIG. 6.

Here, there is assumed a light source device according to a comparative example in which the light path alteration section 24 in the present embodiment is not provided, and the size of the pencil on the wavelength conversion layer is made substantially equivalent to the size of the plane of incidence.

Figure 8:
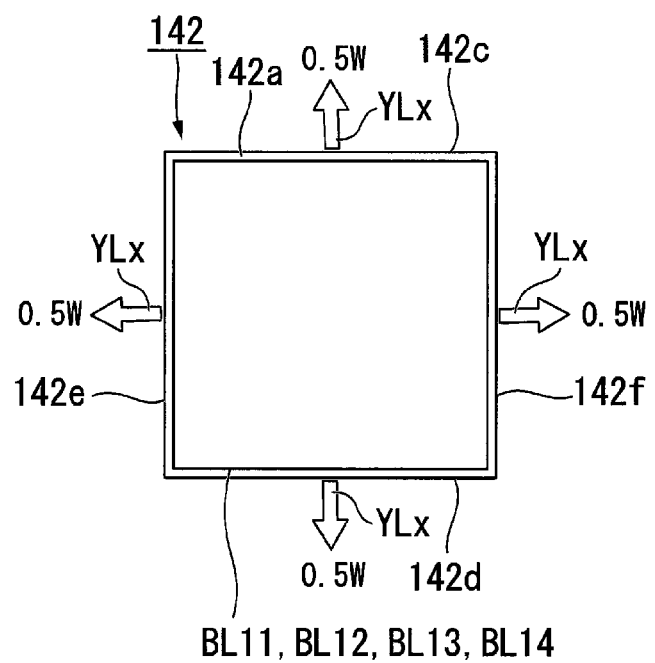
FIG. 8 is a diagram showing pencils on a plane of incidence of a wavelength conversion layer in a light source device according to a comparative example.

FIG. 8 is a diagram showing pencils BL11, BL12, BL13, and BL14 on a plane of incidence 142a of a wavelength conversion layer 142 in the light source device according to the comparative example.

As shown in FIG. 8, since the light source device according to the comparative example is not provided with the light path alteration section 24, all of the first pencil BL11, the second pencil BL12, the third pencil BL13, and the fourth pencil BL14 enter the first light collection optical system 26 from a direction parallel to the light axis ax2 shown in FIG. 2. As a result, the first pencil BL11, the second pencil BL12, the third pencil BL13, and the fourth pencil BL14 overlap each other on the plane of incidence 142a.

In the light source device according to the comparative example, a total amount of the fluorescence emitted from the side surfaces 142c, 142d, 142e, and 142f of the wavelength conversion layer 142 is estimated. As conditions of the estimation, it is assumed that the total amount of the excitation light with which the wavelength conversion layer 142 is irradiated is 20 W, and the wavelength conversion efficiency of the wavelength conversion layer 142 is 50%, and therefore, the total amount of the fluorescence generated in the wavelength conversion layer 142 is 10 W. Further, it is assumed that the fluorescence as much as 5% of the total amount of the fluorescence generated in the wavelength conversion layer 142 is emitted from one of the side surfaces of the wavelength conversion layer 142.

Performing the estimation based on the conditions described above, the fluorescence YLx of 10 W×0.05=0.5 W is emitted from each of the side surfaces 142c, 142d, 142e, and 142f of the wavelength conversion layer 142. Therefore, the total amount of the fluorescence emitted from all of the side surfaces 142c, 142d, 142e, and 142f of the wavelength conversion layer 142 becomes 0.5 W×4=2 W. Since the fluorescence YLx emitted from the side surfaces 142c, 142d, 142e, and 142f of the wavelength conversion layer 142 cannot be used as the illumination light, the fluorescence of 2 W out of the fluorescence of 10 W generated in the wavelength conversion layer 142 becomes the loss.

Figure 7:
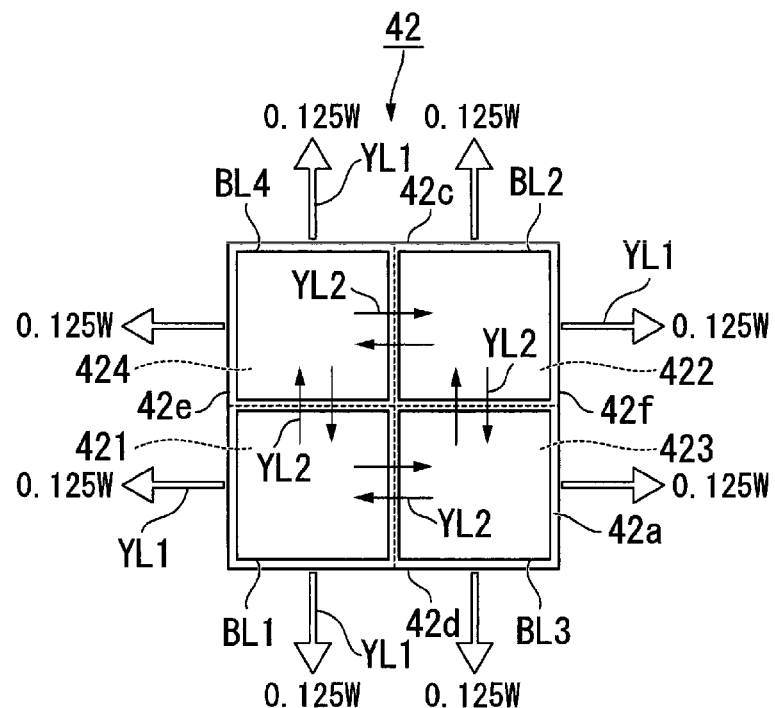
FIG. 7 is a diagram showing pencils on the plane of incidence of the wavelength conversion layer in the light source device according to the first embodiment.

FIG. 7 is a diagram showing the pencils BL1, BL2, BL3, and BL4 on the plane of incidence 42a of the wavelength conversion layer 42 in the light source device 2A according to the present embodiment. It should be noted that the projection magnification by the homogenizer optical system 27 is different between FIG. 7 and FIG. 8. Specifically, the projection magnification by the homogenizer optical system 27 in FIG. 8 is set substantially twice as high as the projection magnification by the homogenizer optical system 27 in FIG. 7.

As shown in FIG. 7, the plane of incidence 42a of the wavelength conversion layer 42 is irradiated with the first pencil BL1, the second pencil BL2, the third pencil BL3, and the fourth pencil BL4 so that the first pencil BL1, the second pencil BL2, the third pencil BL3, and the fourth pencil BL4 do not overlap each other, but are arranged in a 2×2 matrix. Therefore, the wavelength conversion layer 42 is virtually divided into four areas, and the area irradiated with the first pencil BL1 is defined as a first divisional area 421, the area irradiated with the second pencil BL2 is defined as a second divisional area 422, the area irradiated with the third pencil BL3 is defined as a third divisional area 423, and the area irradiated with the fourth pencil BL4 is defined as a fourth divisional area 424.

In the present embodiment, the total amount of the fluorescence emitted from the side surfaces 42c, 42d, 42e, and 42f of the wavelength conversion layer 42 is also estimated using the same conditions as in the comparative example described above. Specifically, it is assumed that the total amount of the excitation light with which the wavelength conversion layer 42 is irradiated is 20 W, and the amount of the excitation light with which each of the first divisional area 421, the second divisional area 422, the third divisional area 423, and the fourth divisional area 424 is irradiated is 5 W. Further, it is assumed that the wavelength conversion efficiency of the wavelength conversion layer 42 is 50%, and the total amount of the fluorescence generated in the wavelength conversion layer 42 is 10 W. Further, it is assumed that the fluorescence as much as 5% of the total amount of the fluorescence generated in the wavelength conversion layer 42 is emitted from one of the side surfaces 42c, 42d, 42e, and 42f of the wavelength conversion layer 42.

Since the total amount of the excitation light with which the wavelength conversion layer 42 is irradiated is 20 W, in the case of the present embodiment, the divisional areas 421, 422, 423, and 424 are irradiated respectively with the pencils BL1, BL2, BL3, and BL4 of 5 W. In this case, since the total amount of the fluorescence generated in each of the divisional areas 421, 422, 423, and 424 becomes 2.5 W, the fluorescence of 2.5 W×0.05=0.125 W is emitted from one of the side surfaces of each of the divisional areas 421, 422, 423, and 424.

Since two of the four side surfaces of each of the divisional areas 421, 422, 423, and 424 form the side surfaces 42c, 42d, 42e, and 42f of the wavelength conversion layer 42, the fluorescence emitted from these side surfaces becomes the fluorescence YL1 to be emitted to the outside from the wavelength conversion layer 42. In contrast, the other two side surfaces are each opposed to the side surface of adjacent one of the divisional areas 421, 422, 423, and 424. The fluorescence YL2 emitted from these side surfaces enters adjacent one of the divisional areas 421, 422, 423, and 424, and is then changed in the proceeding direction by the scattering bodies while propagating through adjacent one of the divisional areas 421, 422, 423, and 424, and is then emitted from the plane of incidence 42a. In other words, the fluorescence YL2 is not the fluorescence to be emitted from the side surfaces 42c, 42d, 42e, and 42f of the wavelength conversion layer 42, and therefore, does not become the loss. As a result, the total amount of the fluorescence emitted from the side surfaces 42c, 42d, 42e, and 42f of the wavelength conversion layer 42 becomes 0.125 W×8=1 W. Therefore, in the case of the present embodiment, the fluorescence of 1 W out of the fluorescence of 10 W generated in the wavelength conversion layer 42 becomes the loss. As described above, the loss of the fluorescence in the light source device 2A according to the present embodiment becomes a half of the loss of the fluorescence in the light source device according to the comparative example.

As described hereinabove, according to the light source device 2A related to the present embodiment, since the first pencil BL1, the second pencil BL2, the third pencil BL3, and the fourth pencil BL4 do not overlap each other on the plane of incidence 42a of the wavelength conversion layer 42, it is possible to suppress the loss of the fluorescence YL emitted from the side surfaces 42c, 42d, 42e, and 42f of the wavelength conversion layer 42. Thus, it is possible to realize the light source device 2A excellent in use efficiency of the fluorescence.

Further, in the case of the present embodiment, since the light source section 21A emits the four pencils BL1, BL2, BL3, and BL4, and the deviation directions S1, S2, S3, and S4 by the four deviation prisms 51, 52, 53, and 54 are perpendicular to each other, it is possible to arrange the four pencils in a 2×2 matrix with respect to the wavelength conversion layer 42 having the substantially square planar shape. Thus, it is easy to realize the configuration in which the four pencils BL1, BL2, BL3, and BL4 do not overlap each other on the plane of incidence 42a of the wavelength conversion layer 42.

Further, in the case of the present embodiment, since the proceeding directions of the principal rays of the respective pencils BL1, BL2, BL3, and BL4 is altered by the respective deviation prisms 51, 52, 53, and 54, it is possible to easily ensure the amount of move of each of the pencils BL1, BL2, BL3, and BL4 on the plane of incidence 42a of the wavelength conversion layer 42 compared to when using other light path alteration devices. Further, by changing the angle of the plane of incidence and the exit surface of each of the deviation prisms 51, 52, 53, and 54, it is possible to adjust the amount of move of each of the pencils BL1, BL2, BL3, and BL4 on the plane of incidence 42a of the wavelength conversion layer 42.

Further, in the case of the present embodiment, since the light path alteration section 24 is formed of the deviation prism array 50 having the four deviation prisms 51, 52, 53, and 54 integrated with each other, it is possible to suppress the error in installation positions of the deviation prisms 51, 52, 53, and 54 when assembling the light source device 2A compared to when the four deviation prisms are not integrated with each other. As a result, it is easy to prevent the pencils from overlapping each other on the plane of incidence 42a of the wavelength conversion layer 42, and thus, it is easy to suppress the loss of the fluorescence.

It should be noted that in each of the deviation prisms 51, 52, 53, and 54, the deviation direction caused on the plane of incidence of the respective deviation prisms and the deviation direction caused on the exit surface of the respective deviation prisms can be made perpendicular to each other. In other words, in the case of the present embodiment, it is possible to adopt a configuration in which the vector of each of the deviation directions S1, S2, S3, and S4 shown in FIG. 6 is resolved into a vector of the deviation direction along the X-axis direction and a vector of the deviation direction along the Z-axis direction, and for example, the deviation angle along the X-axis direction is generated on the plane of incidence of each of the deviation prisms 51, 52, 53, and 54, and the deviation angle along the Z-axis direction is generated on the exit surface thereof. Alternatively, it is also possible to adopt a configuration of generating the deviation angle long the X-axis direction and the deviation angle along the Z-axis direction at the same time on at least one of the plane of incidence and the exit surface of each of the deviation prisms 51, 52, 53, and 54.

The projector 1 according to the present embodiment is equipped with the light source device 2A having the configuration described above, and is therefore excellent in light use efficiency.

Second Embodiment

A second embodiment of the present disclosure will hereinafter be described using FIG. 9.

The basic configuration of the projector and the light source device according to the second embodiment is substantially the same as in the first embodiment. Therefore, the description of the whole of the projector and the light source device will be omitted.

Figure 9:
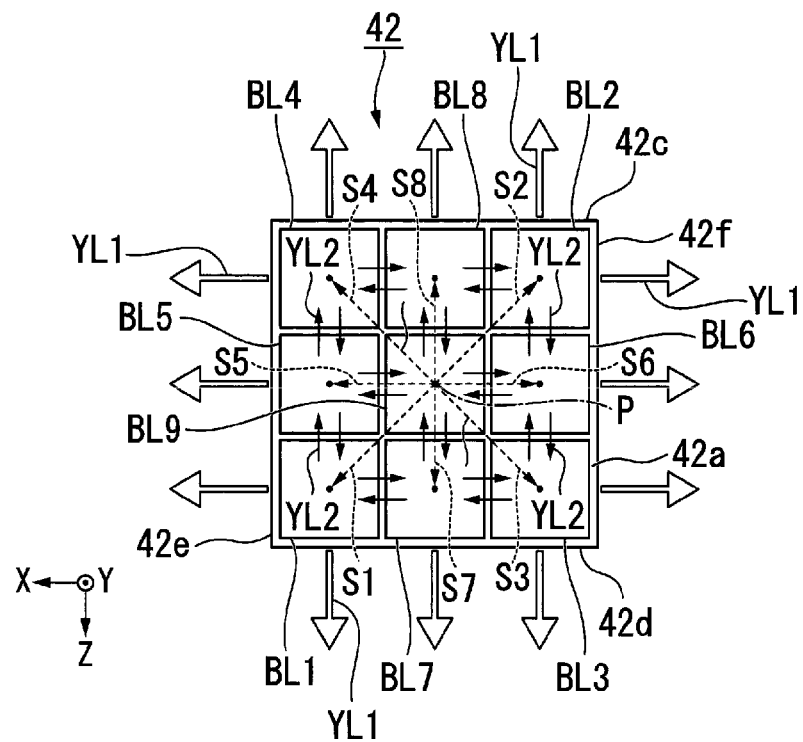
FIG. 9 is a diagram showing an arrangement of pencils on a wavelength conversion layer in a light source device according to a second embodiment.

FIG. 9 is a diagram showing an arrangement of pencils on a wavelength conversion layer in the light source device according to the second embodiment.

In the light source device according to the present embodiment, the light source section emits the first pencil BL1, the second pencil BL2, the third pencil BL3, the fourth pencil BL4, a fifth pencil BL5, a sixth pencil BL6, a seventh pencil BL7, an eighth pencil BL8, and a ninth pencil BL9.

As shown in FIG. 9, the plane of incidence 42a of the wavelength conversion layer 42 is irradiated with the first pencil BL1, the second pencil BL2, the third pencil BL3, the fourth pencil BL4, the fifth pencil BL5, the sixth pencil BL6, the seventh pencil BL7, the eighth pencil BL8, and the ninth pencil BL9 so that the first pencil BL1, the second pencil BL2, the third pencil BL3, the fourth pencil BL4, the fifth pencil BL5, the sixth pencil BL6, the seventh pencil BL7, the eighth pencil BL8, and the ninth pencil BL9 do not overlap each other, but are arranged in a 3×3 matrix along the X-axis direction and the Z-axis direction. Further, the irradiation with the first pencil BL1, the second pencil BL2, the third pencil BL3, the fourth pencil BL4, the fifth pencil BL5, the sixth pencil BL6, the seventh pencil BL7, the eighth pencil BL8, and the ninth pencil BL9 is performed at intervals.

The principal ray of the first pencil BL1 is located at a point shifted toward the +X-axis direction and shifted toward the +Z-axis direction with respect to the center P of the plane of incidence 42a. The principal ray of the second pencil BL2 is located at a point shifted toward the −X-axis direction and shifted toward the −Z-axis direction with respect to the center P of the plane of incidence 42a. The principal ray of the third pencil BL3 is located at a point shifted toward the −X-axis direction and shifted toward the +Z-axis direction with respect to the center P of the plane of incidence 42a. The principal ray of the fourth pencil BL4 is located at a point shifted toward the +X-axis direction and shifted toward the −Z-axis direction with respect to the center P of the plane of incidence 42a.

In contrast, the principal ray of the fifth pencil BL5 is located at a point shifted toward the +X-axis direction with respect to the center P of the plane of incidence 42a. The principal ray of the sixth pencil BL6 is located at a point shifted toward the −X-axis direction with respect to the center P of the plane of incidence 42a. The principal ray of the seventh pencil BL7 is located at a point shifted toward the +Z-axis direction with respect to the center P of the plane of incidence 42a. The principal ray of the eighth pencil BL8 is located at a point shifted toward the −Z-axis direction with respect to the center P of the plane of incidence 42a.

Further, the principal ray of the ninth pencil BL9 is located at the center P of the plane of incidence 42a. In other words, the position of the principal ray of the ninth pencil BL9 is not shifted from the center P of the plane of incidence 42a.

Although not shown in the drawings, the light path alteration section is formed of a deviation prism array including eight deviation prisms, namely a first deviation prism for altering the proceeding direction of the principal ray of the first pencil BL1, a second deviation prism for altering the proceeding direction of the principal ray of the second pencil BL2, a third deviation prism for altering the proceeding direction of the principal ray of the third pencil BL3, a fourth deviation prism for altering the proceeding direction of the principal ray of the fourth pencil BL4, a fifth deviation prism for altering the proceeding direction of the principal ray of the fifth pencil BL5, a sixth deviation prism for altering the proceeding direction of the principal ray of the sixth pencil BL6, a seventh deviation prism for altering the proceeding direction of the principal ray of the seventh pencil BL7, and an eighth deviation prism for altering the proceeding direction of the principal ray of the eighth pencil BL8.

The deviation prisms constituting the deviation prism array alter the proceeding directions of the principal rays of the respective pencils BL1, BL2, BL3, BL4, BL5, BL6, BL7, BL8 except the ninth pencil BL9 so that all of the first pencil BL1, the second pencil BL2, the third pencil BL3, the fourth pencil BL4, the fifth pencil BL5, the sixth pencil BL6, the seventh pencil BL7, the eighth pencil BL8, and the ninth pencil BL9 do not overlap each other on the plane of incidence 42a of the wavelength conversion layer 42.

Regarding the first deviation prism, the second deviation prism, the third deviation prism, and the fourth deviation prism out of the eight deviation prisms described above, since the deviation directions S1, S2, S3, and S4 are the same as those in the first embodiment, the deviation prisms having the shapes shown in FIG. 5 in the first embodiment are used.

Figure 10:
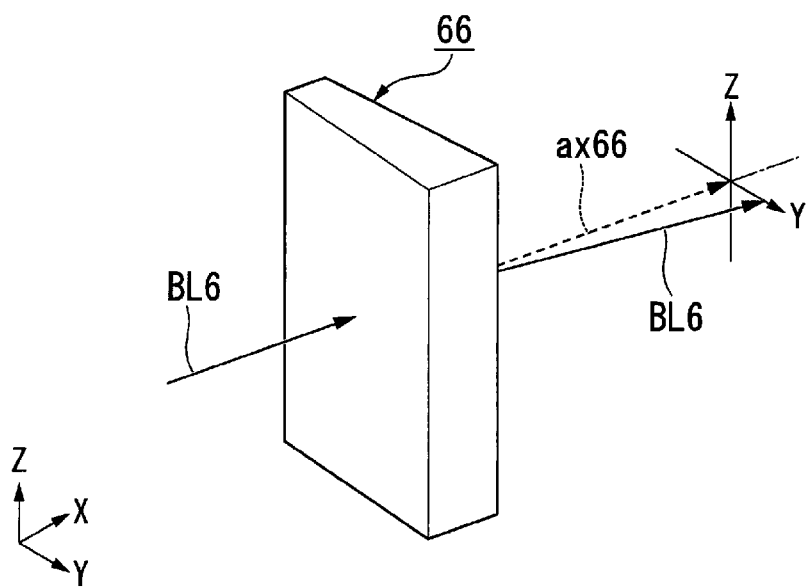
FIG. 10 is a perspective view of a sixth deviation prism.

FIG. 10 is a perspective view of the sixth deviation prism 66 disposed on the light path of the sixth pencil BL6.

As shown in FIG. 10, regarding the sixth deviation prism 66, it is sufficient to shift the principal ray of the sixth pencil BL6 toward the −X-axis direction with respect to the center P of the plane of incidence 42a as indicated as the deviation direction S6 in FIG. 9. Therefore, as shown in FIG. 10, there is used a deviation prism having a trapezoidal cross-sectional shape in the X-Y plane, and a rectangular cross-sectional shape in the X-Z plane. In this case, the proceeding direction of the principal ray of the sixth pencil BL6 having entered the sixth deviation prism 66 is refracted along the +Y-axis direction.

Similarly, regarding the fifth deviation prism, it is sufficient to shift the principal ray of the fifth pencil BL5 toward the +X-axis direction with respect to the center P of the plane of incidence 42a as indicated as the deviation direction S5 in FIG. 9. Therefore, there is used a deviation prism having a trapezoidal cross-sectional shape in the X-Y plane, and a rectangular cross-sectional shape in the X-Z plane. In this case, the proceeding direction of the principal ray of the fifth pencil BL5 having entered the fifth deviation prism is refracted along the −Y-axis direction shown in FIG. 10.

Regarding the seventh deviation prism, it is sufficient to shift the principal ray of the seventh pencil BL7 toward the +Z-axis direction with respect to the center P of the plane of incidence 42a as indicated as the deviation direction S7 in FIG. 9. Therefore, there is used a deviation prism having a rectangular cross-sectional shape in the X-Y plane, and a trapezoidal cross-sectional shape in the X-Z plane. In this case, the proceeding direction of the principal ray of the seventh pencil BL7 having entered the seventh deviation prism is refracted along the −Z-axis direction shown in FIG. 10.

Regarding the eighth deviation prism, it is sufficient to shift the principal ray of the eighth pencil BL8 toward the −Z-axis direction with respect to the center P of the plane of incidence 42a as indicated as the deviation direction S8 in FIG. 9. Therefore, there is used a deviation prism having a rectangular cross-sectional shape in the X-Y plane, and a trapezoidal cross-sectional shape in the X-Z plane. In this case, the proceeding direction of the principal ray of the eighth pencil BL8 having entered the eighth deviation prism is refracted along the +Z-axis direction shown in FIG. 10.

Therefore, regarding the fifth deviation prism, the seventh deviation prism, and the eighth deviation prism, it is possible to use the deviation prisms having the shapes obtained by rotating the sixth deviation prism 66 by 90° centering on the optical axis ax66.

Further, since the position of the principal ray of the ninth pencil BL9 is not shifted from the center P of the plane of incidence 42a, it is possible to dispose a parallel plate having a light transmissive property, or to provide a space where no member is disposed, on the light path through which the ninth pencil BL9 passes in the deviation prism array.

The rest of the configuration of the light source device and the projector is substantially the same as in the first embodiment.

Also in the present embodiment, similarly to the first embodiment, regarding the areas to be irradiated with the respective pencils BL1, BL2, BL3, BL4, BL5, BL6, BL7, BL8, and BL9 on the plane of incidence 42a of the wavelength conversion layer 42 as divisional areas, the fluorescence YL1 emitted from the side surfaces forming the side surfaces 42c, 42d, 42e, and 42f of the wavelength conversion layer 42 out of the four side surfaces of each of the divisional areas becomes the loss. In contrast, the fluorescence YL2 emitted from the side surfaces opposed to the side surface of adjacent one of the divisional areas is emitted from the plane of incidence 42a, and therefore, does not become the loss.

As described hereinabove, also in the present embodiment, it is possible to obtain substantially the same advantages as those of the first embodiment such as the advantage that the amount of the loss of the fluorescence emitted from the side surfaces 42c, 42d, 42e, and 42f of the wavelength conversion layer 42 can be suppressed, and thus it is possible to realize the light source device excellent in use efficiency of the fluorescence.

It should be noted that the scope of the present disclosure is not limited to the embodiments described above, but a variety of modifications can be provided thereto within the scope or the spirit of the present disclosure.

For example, in the embodiments described above, since the plane of incidence of the wavelength conversion layer is irradiated with the pencils adjacent to each other at intervals, it is possible to reduce the possibility that the pencils adjacent to each other overlap each other even when there is an error such as a manufacturing error or an assembling error of the deviation prisms. It should be noted that it is also possible to adopt a configuration in which the irradiation is performed so that the pencils adjacent to each other have contact with each other.

Further, in the embodiments described above, there is provided the light source section for emitting the four pencils or the light source section for emitting the nine pencils, and these light source sections are suitable for irradiating the wavelength conversion layer having a substantially square planar shape. However, the number of pencils emitted by the light source section is not limited to the embodiments described above, and it is sufficient for the plurality of pencils emitted by the light source section to include at least two pencils, namely the first pencil and the second pencil.

Besides the above, the specific descriptions of the shape, the number, the arrangement, the material, and so on of the constituents of the light source device and the projector are not limited to those of the embodiments described above, but can arbitrarily be modified. Although in each of the embodiments, there is described the example of installing the light source device according to the present disclosure in the projector using the liquid crystal light valves, the example is not a limitation. The light source device according to the present disclosure can also be installed in the projector using digital micromirror devices as the light modulation devices.

Although in each of the embodiments, there is described the example of installing the light source device according to the present disclosure in the projector, the example is not a limitation. The light source device according to the present disclosure can also be applied to lighting equipment, a headlight of a vehicle, and so on.

What is claimed is:

1. A light source device comprising:
a light source section configured to emit a first pencil and a second pencil which have a first wavelength band;
a first optical element configured to alter a proceeding direction of a principal ray of the first pencil;
a second optical element configured to alter a proceeding direction of a principal ray of the second pencil; and
a wavelength conversion layer having a plane of incidence which the first pencil and the second pencil enter, and configured to perform wavelength conversion of the first pencil and the second pencil into fluorescence having a second wavelength band different from the first wavelength band, wherein
the first optical element and the second optical element alter the proceeding directions of the principal ray of the first pencil and the principal ray of the second pencil so that the first pencil and the second pencil fail to overlap each other on the plane of incidence,
the first optical element and the second optical element are deviation prisms,
the deviation prism has a plane of incidence and an exit surface different from the plane of incidence, and
a deviation direction generated on the plane of incidence and a deviation direction generated on the exit surface are perpendicular to each other.

2. The light source device according to claim 1, wherein a deviation direction by the first optical element and a deviation direction by the second optical element are perpendicular to each other.

3. The light source device according to claim 2, wherein the first optical element and the second optical element are integrated with each other.

4. The light source device according to claim 1, wherein the first optical element and the second optical element are integrated with each other.

5. A projector comprising:
the light source device according to claim 1;
a light modulation device configured to modulate light emitted from the light source device in accordance with image information; and
a projection optical device configured to project the light modulated by the light modulation device.

* * * * *